(12) United States Patent
Morino

(10) Patent No.: US 8,848,070 B2
(45) Date of Patent: Sep. 30, 2014

(54) IMAGE CAPTURING APPARATUS AND METHOD OF CONTROLLING THE APPARATUS

(75) Inventor: Takashi Morino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 12/832,594

(22) Filed: Jul. 8, 2010

(65) Prior Publication Data

US 2011/0050951 A1 Mar. 3, 2011

(30) Foreign Application Priority Data

Aug. 25, 2009 (JP) ................................ 2009-194642

(51) Int. Cl.
*H04N 9/73* (2006.01)
*H04N 5/235* (2006.01)
*H04N 5/232* (2006.01)

(52) U.S. Cl.
CPC .............. *H04N 5/232* (2013.01); *H04N 5/2357* (2013.01); *H04N 5/2353* (2013.01); *H04N 5/23245* (2013.01)
USPC ........................................ 348/226.1; 348/362

(58) Field of Classification Search
USPC .................... 348/220, 221.1, 226.1, 281, 294
See application file for complete search history.

(56) References Cited

U.S. PATENT DOCUMENTS

| 5,640,202 | A | | 6/1997 | Kondo et al. | |
|---|---|---|---|---|---|
| 5,786,851 | A | | 7/1998 | Kondo et al. | |
| 5,892,551 | A | * | 4/1999 | Uematsu | 348/447 |
| 7,248,289 | B2 | | 7/2007 | Katoh et al. | |
| 7,636,109 | B2 | * | 12/2009 | Nakajima et al. | 348/226.1 |
| 2005/0046704 | A1 | * | 3/2005 | Kinoshita | 348/226.1 |
| 2006/0132859 | A1 | * | 6/2006 | Kalapathy et al. | 358/463 |
| 2007/0046789 | A1 | * | 3/2007 | Kirisawa | 348/226.1 |
| 2007/0182831 | A1 | | 8/2007 | Katoh et al. | |
| 2009/0167911 | A1 | * | 7/2009 | Takane | 348/296 |

FOREIGN PATENT DOCUMENTS

| JP | 07-298112 | | 11/1995 |
|---|---|---|---|
| JP | 2005-033616 | A | 2/2005 |
| JP | 2005-229353 | A | 8/2005 |
| JP | 2005-260733 | A | 9/2005 |
| JP | 3823314 | | 9/2006 |
| JP | 2008-011226 | A | 1/2008 |

OTHER PUBLICATIONS

Jul. 16, 2013 Japanese Office Action, that issued in Japanese Patent Application No. 2009-194642.
The above reference was cited in a Oct. 4, 2013 Japanese Office Action, which is enclosed without English Translation, that issued in Japanese Patent Application No. 2009-194642.

* cited by examiner

*Primary Examiner* — Trung Diep
(74) *Attorney, Agent, or Firm* — Cowan, Liebowitz & Latman, P.C.

(57) ABSTRACT

An image capturing apparatus and its control method for capturing a moving image. Plural movie capturing modes with different control parameters are set in accordance with an instruction from a user. One of selectable frame rates is selected in accordance with video output setting by the user. Moving image frames are generated based on the selected frame rate and a control parameter corresponding to the frame rate, and recorded as a moving image on a recording medium.

8 Claims, 5 Drawing Sheets

| OPERATION MODE | | IMAGE SIGNAL READOUT AND FRAME RATE |
|---|---|---|
| FLICKER DETECTION | | THINNING READOUT 1 22fps |
| STILL IMAGE CAPTURING | | THINNING READOUT 1 30fps |
| MOVIE CAPTURING | 24fps | THINNING READOUT 1 24fps |
| | 25fps | THINNING READOUT 1 25fps |
| | 30fps | THINNING READOUT 1 30fps |
| | 50fps | THINNING READOUT 2 50fps |
| | 60fps | THINNING READOUT 2 60fps |
| ENLARGED DISPLAY | | PARTIAL READOUT 30fps |

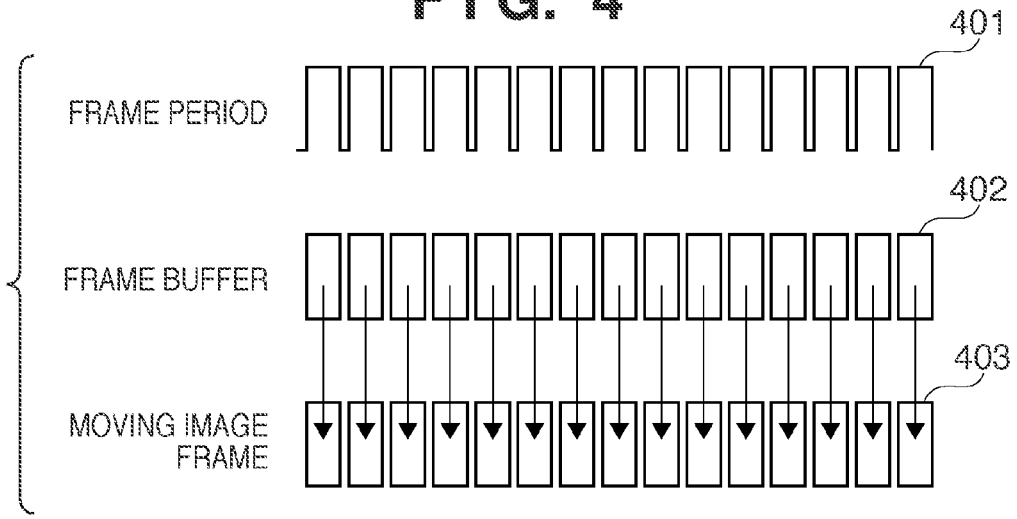

FIG. 6

| VIDEO OUTPUT SETTING | SELECTABLE FRAME RATE SETTING |
|---|---|
| NTSC | 24fps |
|  | 30fps |
|  | 60fps |
| PAL | 24fps |
|  | 25fps |
|  | 50fps |

FIG. 7

| NTSC | PAL |
|---|---|
| 30fps | 25fps |
| 60fps | 50fps |

IMAGE CAPTURING APPARATUS AND METHOD OF CONTROLLING THE APPARATUS

BACKGROUND OF THE INVENTION

1. Field of the Invention

The present invention relates to an image capturing apparatus capable of capturing a moving image and its control method.

2. Description of the Related Art

In recent years, a digital camera that records image data obtained by converting an image signal of an object obtained with a solid-state image sensor such as a CCD into a digital signal into a recording medium, which has a movie capturing function in addition to a general still image capturing function is known. It is known that when movie capturing is performed with an image capturing apparatus using a CCD or a CMOS sensor under a fluorescent light driven with a commercial power supply, brightness fluctuation occurs by frame and/or bright/dark horizontal stripes occur in a frame. The brightness/darkness fluctuation is called flicker which can be reduced by controlling an electronic shutter at a shutter speed of n/100 sec (n is a natural number) with respect to flicker of 50 Hz, and a shutter speed of n/120 sec with respect to flicker of 60 Hz.

On the other hand, some digital cameras with the movie capturing function have a function of arbitrarily selecting a recording size of a movie and a frame rate and a function of changing to a full-screen display or an enlarged display. Further, for appreciation of recorded still images and moving images, such digital camera has a function of playback display on an LCD monitor unit or the like of the camera, and further, appreciation on a TV monitor or the like can be performed through a video output terminal or an HDMI terminal. As the video output mode in this case, the NTSC or PAL system is adopted in the respective regions in the world.

Japanese Patent No. 3823314 discloses extraction of a flicker component upon flicker detection by detection by each of plural flicker detection regions set in a vertical scanning direction and obtaining a difference between brightness data of continuous two regions, then measuring an interval between the extracted flicker components and converting the interval to a frequency. Further, Japanese Patent Laid-Open No. 07-298112 discloses, in a moving image pickup system, freely changing a frame rate upon recording or through operation in accordance with purpose.

In a movie capturing function enabling frame rate selection, it might be difficult to perform flicker detection in control at a selected frame rate. Upon image capturing under a fluorescent light connected to a commercial power supply, brightness/darkness horizontal stripes occur in a recorded moving image. Further, when a recorded moving image is playback-displayed, it is desirable to playback-display the moving image at a frame rate selected upon recording. However, upon appreciation of the moving image on a TV monitor or the like via a video output terminal or an HDMI terminal, it is necessary to perform output at a predetermined frame rate based on standards of the NTSC or PAL system. Accordingly, appreciation is performed at a display frame rate which is different from that upon recording.

SUMMARY OF THE INVENTION

An aspect of the present invention is to eliminate the above-mentioned problems with the conventional technology.

The present invention has as its object, to provide an image capturing apparatus and its control method for selection and control of image signal readout and a frame rate in accordance with operation mode such as still image capturing, movie recording at an arbitrary frame rate, an enlarged display and the like.

According to an aspect of the present invention, there is provided an image capturing apparatus comprising: a photographing unit configured to capture image of an object to generate an image signal; a mode changeover unit configured to change to one of a plurality of image capturing modes corresponding to different video systems; and a control unit configured to perform control so as to perform flicker detection based on an image signal obtained by setting a control parameter for detecting flicker and performing image capturing operation by the photographing unit, and then set a control parameter corresponding to the image capturing mode changed by the mode changeover unit and perform the image capturing operation by the photographing unit, wherein the control parameter for detecting flicker is different from the control parameters corresponding to the plurality of image capturing modes.

According to another aspect of the present invention, there is provided a control method for controlling an image capturing apparatus comprising: capturing image of an object to generate an image signal; changing to one of a plurality of image capturing modes corresponding to different video systems; and controlling to perform flicker detection based on an image signal obtained by setting a control parameter for detecting flicker and performing image capturing operation in the capturing step, and then set a control parameter corresponding to the image capturing mode changed in the changing step and perform the image capturing operation in the capturing step, wherein the control parameter for detecting flicker is different from the control parameters corresponding to the plurality of image capturing modes.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 4 is a timing chart describing the movie capturing with the digital camera;

FIG. 5 depicts a view describing a table showing the relation between set operation modes and control parameters;

FIG. 6 depicts a view illustrating a table describing the relation between video output settings and selectable frame rates in the digital camera; and FIG. 7 depicts a view illustrating a table describing the relation between the video output settings and the frame rates in the digital camera.

DESCRIPTION OF THE EMBODIMENTS

An embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

Figure 1:
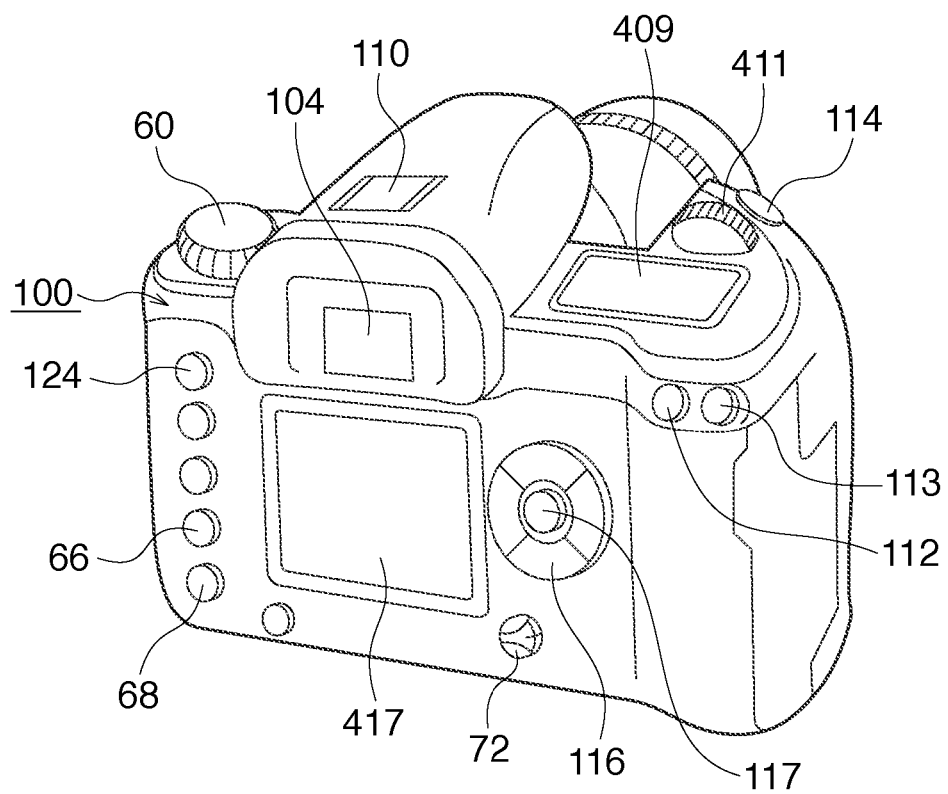
FIG. 1 depicts a perspective view illustrating an outer appearance of a digital camera according to an embodiment of the present invention.

FIG. 1 depicts a perspective view of an outer appearance of a digital camera 100 according to an embodiment of the present invention.

In FIG. 1, an accessory shoe 110, an optical viewfinder 104, an AE (automatic exposure) lock button 112, an AF focus detection point selection button 113, and a release button 114 for a capturing operation are provided in an upper part of the digital camera 100. Further, a dial 411, a mode dial 60 and a display unit 409 are provided. The dial 411 is a device to, with other operation button(s), input a numeral value into the camera, and to input various signals to for example change an image capturing mode. Further, the display unit 409 having a liquid crystal display displays information on image capturing conditions and the like such as a shutter speed, an aperture value, image capturing modes corresponding to different video systems.

Further, an LCD monitor 417 to display an object image, a captured image, various setting screen images is provided on the rear surface of the camera main body. Further, a playback switch 66 to display a captured image on the LCD monitor 417, a single shooting/continuous shooting switch 68, a cross switch 116, an SET button 117, a menu button 124 and a power source switch 72 are provided.

The single shooting/continuous shooting switch 68 is used for, when the release button 114 is depressed, setting a single shooting mode to perform image capturing for 1 frame and to set the camera into a standby status or a continuous shooting mode to continuously perform image capturing while the release button 114 is depressed. The cross switch 116 has four buttons provided in upper, lower, left and right positions and the SET button 117 provided in the central position. The cross switch 116 is used by a user to designate selection and execution of menu items displayed on the LCD monitor 417, in the camera. The menu button 124 is a button for display of a menu screen for various camera settings on the LCD monitor 417. For example, to select and set an image capturing mode (mode changeover), the menu button 124 is depressed then the upper, lower, left and right buttons of the cross switch 116 are operated so as to select a desired mode. Then, in a status where the desired mode is selected, the SET button 117 is depressed, thereby the setting is completed.

Figure 2:
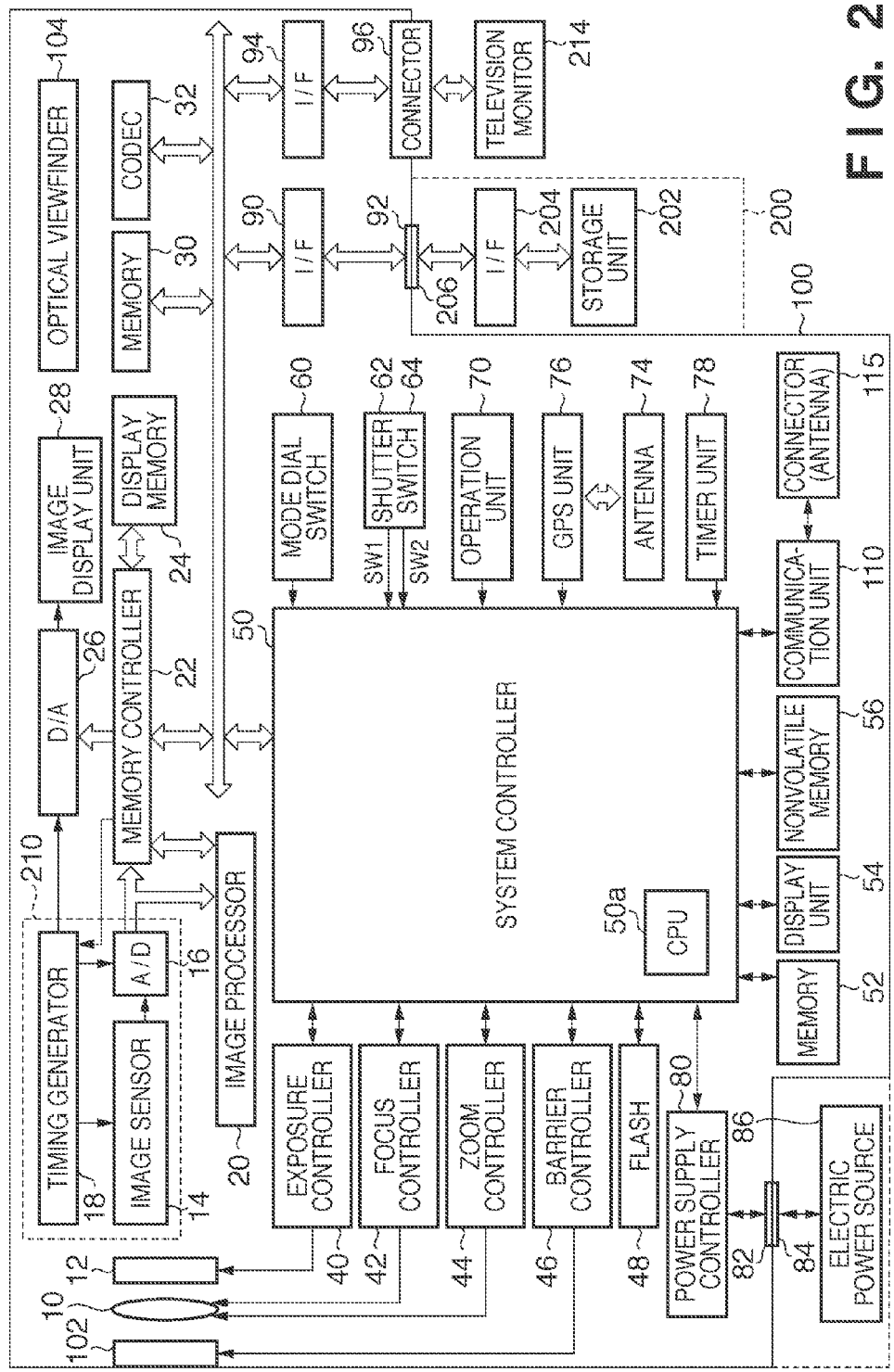
FIG. 2 is a block diagram describing a circuit diagram of the digital camera according to the embodiment.

FIG. 2 is a block diagram describing a circuit diagram of the digital camera according to the present embodiment.

The digital camera according to the present embodiment has a photographing lens 10, a shutter 12 having an aperture function, an image sensor 14 to convert an object optical image into an electric signal (image signal), and an A/D converter 16 to convert an analog signal output from the image sensor 14 into a digital signal. Further, a timing generator 18, which supplies a clock signal and a control signal to the image sensor 14, the A/D converter 16 and the D/A converter 26, is controlled by a memory controller 22 and a system controller 50. An image capturing controller 210 includes these image sensor 14, the A/D converter 16, the timing generator 18 and the like. An image processor 20 performs predetermined pixel interpolating processing and color conversion processing on data from the A/D converter 16 or data from the memory controller 22. Further, the image processor 20 performs predetermined calculation processing using captured image data. The system controller 50 performs TTL (through the lens) AF (automatic focus) processing, AE (automatic exposure) processing and EF (pre-flash) processing to control an exposure controller 40 and a focus controller 42 based on the result of calculation. Further, the image processor 20 also performs predetermined calculation processing using captured image data and performs TTL AWB (automatic white balance) processing based on the result of calculation.

The memory controller 22 controls the A/D converter 16, the timing generator 18, the image processor 20, an display memory 24, the D/A converter 26, a memory 30, and a codec 32. Data from the A/D converter 16 is written via the image processor 20 and the memory controller 22, or data from the A/D converter 16 is directly written via the memory controller 22, into the display memory 24 or the memory 30. An image display unit 28, corresponding to the LCD monitor 417 in FIG. 1, is a display unit such as a TFT-LCD. Image data for display written in the display memory 24 is displayed with the image display unit 28 via the D/A converter 26. By sequentially displaying captured image data using the image display unit 28, an electronic viewfinder function can be realized. Further, the image display unit 28 can be arbitrarily ON/OFF controlled in accordance with an instruction from the system controller 50. When the display is turned OFF, electric consumption of the digital camera 100 can be greatly reduced.

The memory 30 which is used for storage of captured still images and moving image data has a sufficient storage capacity for storing a predetermined number of still images and moving image data for a predetermined time period. With this arrangement, even upon continuous shooting to continuously capture plural still images and panoramic shooting, high-speed and a large amount of image data can be written into the memory 30. Further, upon movie capturing, the memory 30 is also used as a frame buffer for storage of images continuously written at a predetermined rate. Further, the memory 30 is also used as a work area for the system controller 50. The codec 32 compresses or decompresses image data by ADCT (Adaptive Discrete Cosine Transform) or the like, reads an image stored in the memory 30 and performs expansion processing and compresses data to be written into the memory 30.

The exposure controller 40 controls the shutter 12 having an aperture function. The exposure controller 40 also has a flash exposure control function in cooperation with a flash 48. The focus controller 42 controls focusing with the photographing lens 10. A zoom controller 44 controls zooming with the photographing lens 10. A barrier controller 46 controls the operation of a barrier 102. The flash 48 has a light projecting function as an AF fill light and a flash control function. The exposure controller 40 and the focus controller 42 are controlled using the TTL metering. The system controller 50 controls the exposure controller 40 and the focus controller 42 based on the result of calculation with the image processor 20 with respect to captured image data.

The system controller 50, having a CPU 50a such as a microcomputer, controls the entire digital camera 100. A memory 52 holds constant numbers, variables, programs and the like for the operation of the system controller 50. A display unit 54, such as a speaker and a display, displays operation statuses and messages using characters, images, voice messages and the like in accordance with execution of a program by the system controller 50. The display unit 54, having a combination of for example a liquid crystal display or LED, a sound generator and the like, is provided in single or plural recognizable positions around an operation unit of the digital camera 100. Further, a part of the functions of the display unit 54 is provided in the optical viewfinder 104. Among display contents displayed on the display unit 54, contents displayed on a liquid crystal display or the like are a single shooting/continuous shooting mode, a self timer, a compression rate, the number of recording pixels, the number of recorded images, an available shooting number, a shutter speed, an aperture value, an exposure compensation, a flash mode, a red-eye reduction mode, and a macro image capturing mode. Further, a buzzer setting, a clock battery display, a battery display, an error display, information using a plural digit number, a recording medium 200 attachment/detachment status, a communication I/F operation, a date/time display and the like, are included. Further, among the display contents on the display unit 54, as contents displayed in the optical viewfinder 104, an in-focus indication, a camera-shake warning display, a flash charging display, a shutter speed, an aperture value, an exposure correction and the like are provided. As a nonvolatile memory 56, an electrically erasable and recordable memory such as an EEPROM is used.

An operation mechanism (60, 62, 64 and 70) is a device which is a single or a combination of plural devices such as switches, dials, a touch panel, a device for positioning by detection of line of sight and a device for speech recognition, to input various operation instructions for the system controller 50. A mode dial switch 60 is used for changing and setting from various function modes including a power off mode, an auto shooting mode, an image capturing mode, a panoramic shooting mode, a playback mode, a multi-frame playback/erase mode and a movie capturing mode. A shutter switch 62 (SW1) becomes ON in the middle of operation of the above-described release button 114, to instruct to start AF (auto focus) processing, AE (auto exposure) processing, AWB (auto white balance) processing, EF (pre-flash) processing or the like. A shutter switch 64 (SW2) becomes ON upon completion of the operation of the release button 114, to instruct to start exposure processing to write a signal read from the image sensor 14 via the A/D converter 16 and the memory controller 22 into the memory 30, and developing processing, further, to instruct to start the operation of recording processing to read image data from the memory 30, compress the image data with the codec 32 and write the compressed data into the recording medium 200.

An operation unit 70 includes various buttons such as a live view start/stop button, a movie recording start/stop button, a menu button, a set button, a macro button, a new page button and a flash setting button, a touch panel, and the like. Further, the operation unit 70 includes a single/continuous/self-timer set button, a menu movement + (plus) button, a menu movement − (minus) button, a playback image movement + (plus) button, a playback image movement − (minus) button, a capturing image quality selection button, an exposure compensation button and a date/time setting button. That is, the playback switch 66, the single shooting/continuous shooting switch 68, the cross switch 116, the SET button 117, the menu button 124 and the like shown in FIG. 1 are included.

A GPS antenna 74 receives an electric wave from a GPS satellite. A GPS unit 76 performs calculation from the received data, and detects a current position. Map information stored in the nonvolatile memory 56 or the memory 30 can be read, or map information from an external device can be read through an interface 90 or a communication unit 110, based on the positional information. Further, a timer unit 78 holds current time information (year/month/day, time/minute/second and day of week).

A power supply controller 80 has a battery detection circuit, a DC-DC converter, a switch circuit for change of energized block and the like. The power supply controller 80 detects a battery attached/detached status, a battery type and a battery remaining capacity, then controls the DC-DC converter based on the result of detection and an instruction from the system controller 50, and supplies necessary voltage to the respective units including the recording medium for a necessary period. Reference numerals 82 and 84 denote connectors. An electric power source 86 is a primary battery such as an alkali battery or a lithium battery, or a secondary battery such as an NiCd battery, an NiMH battery or an Li battery, or an AC adapter, or the like.

The interface 90 is an interface with respect to a recording medium such as a memory card, a hard disk or the like. A connector 92 is connected to the recording medium such as a memory card or a hard disk. Note that in the present embodiment, the apparatus has an interface and a connector for attachment of a recording medium. The interface and the connector for attachment of the recording medium may be provided in a single or plural positions. Further, a removable or nonremovable medium may be used as the recording medium.

Further, a combination of an interface and a connector based on different standards may be provided. An interface and a connector compliant with PCMCIA card or CF (compact flash) card standards may be used. Further, the interface 90 and the connector 92 compliant with the PCMCIA card or CF (compact flash) card standards may be employed. Various communication cards such as a LAN card, a modem card, a USB card, an IEEE1394 card, a P1284 card, a SCSI card and a PHS card may be connected. With this arrangement, image data and management information attached to the image data can be transmitted/received with respect to a peripheral device such as another computer or a printer.

An interface 94 and a connector 96 are connection terminals for connection of cables connected to a television monitor 214, which are component output and HDMI output terminals and the like compliant with TV standards. In accordance with setting status or cable connection status, the LCD monitor 417 or the television monitor 214 can be selected as a display output destination, otherwise, display output can be simultaneously performed on these monitors.

The barrier 102 covers an image capturing part of the digital camera 100 including the lens 10, to prevent soil and/or breakage of an image capturing unit. The optical viewfinder 104 is capable of image capturing only using an optical finder without the electronic viewfinder function with the image display unit 28. Further, a part of the functions of the display unit 54, for example an in-focus indication, a camera-shake warning display, a flash charging display, a shutter speed display, an aperture value display, an exposure compensation display and the like are provided in the optical viewfinder 104.

A communication unit 110 is capable of communication with another external device by at least RS232C, USB, IEEE1394, P1284, SCSI, modem or LAN communication, or radio communication via an antenna 115. With this arrangement, image data and/or management information attached to the image data can be transmitted/received with respect to an external device such as another computer or a printer via the communication unit 110.

A recording medium 200 has a storage unit 202 such as a semiconductor memory or a magnetic disc, an interface 204 between the recording medium and the digital camera 100, and a connector 206 for connection to the digital camera 100. The recording medium 200 is for example a memory card or a hard disk.

Figure 3:
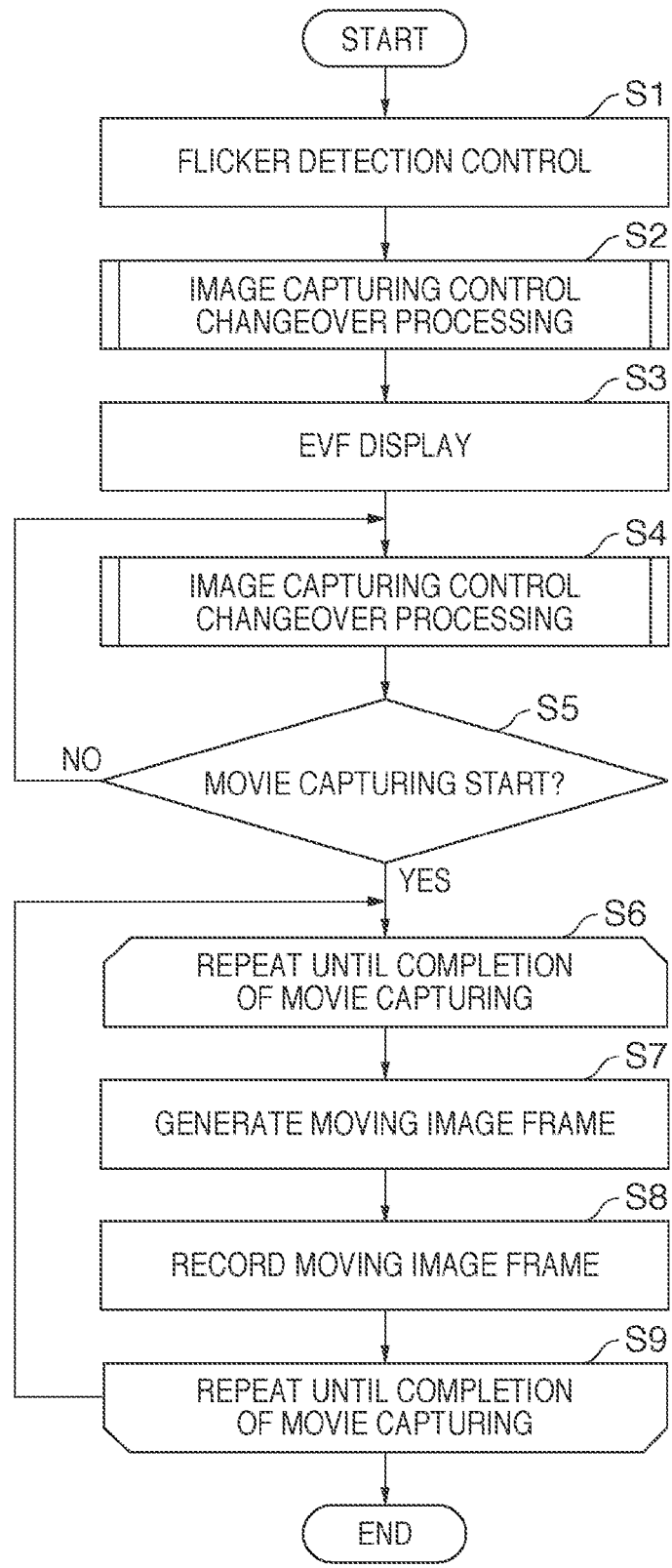
FIG. 3 is a flowchart describing the flow of movie capturing processing with the digital camera.

FIG. 3 is a flowchart describing movie capturing processing with the digital camera 100 according to the present embodiment. This processing is performed by execution of the program stored in the nonvolatile memory 56 by the CPU 50a of the system controller 50.

FIG. 4 is a timing chart describing the movie capturing with the digital camera 100 according to the present embodiment. Next, the movie capturing processing with the digital camera 100 according to the present embodiment will be described using FIGS. 3 and 4.

To perform movie capturing, first, it is necessary to use the menu button 124 and the mode dial 60 to change the image capturing mode from the still image capturing mode to the movie capturing mode. When the image capturing mode is changed to the movie capturing mode, the system controller 50 moves a quick return mirror (not shown) to the outside a photographic optical path, and releases the shutter 12 to expose the image sensor 14 to object light. At this time, image data read from the image sensor 14 is continuously written at a frame period denoted by numeral 401 in FIG. 4 into the memory 30 which functions as a frame buffer as denoted by numeral 402.

The processing in FIG. 3 is started in accordance with instruction of the movie capturing mode. First, in step S1, flicker detection is performed for a constant period after the instruction of the movie capturing mode. That is, the presence/absence of flicker and the frequency are detected based on the image signal output from the image sensor 14 by controlling the readout of the image signal output from the image sensor 14 and the frame period using a flicker detection control parameter to be described later. When the flicker detection has been completed, the process proceeds to step S2, in which image capturing control changeover processing is performed in correspondence with the previously-set image capturing mode, the setting of the moving image frame rate, the full-screen display or enlarged display.

Next, the process proceeds to step S3, in which the LCD monitor 417 is caused to function as an electronic viewfinder (EVF). Then, the moving image data written in the memory 30 (frame buffer) is read using the image processor 20 and various image processings are performed in accordance with necessity, and the processed image data is displayed on the LCD monitor 417. In step S4, when the image capturing mode and/or the moving image frame rate are changed and/or the screen display is changed to full-screen/enlarged display using the menu button 124 and/or the mode dial 60, image capturing control changeover processing is performed in correspondence with the changed contents.

In step S5, when turning ON of the movie recording start button of the operation unit 70 (for example, depression of the SET button 117 in the movie capturing mode) is detected, the process proceeds to step S6. In step S6, the movie capturing processing to record a captured moving image in the operation mode, set with the operation mode changeover processing in step S2 or S4, is started. When the movie capturing processing is started, then in step S7, the image data written in the frame buffer is read, the image data is compressed using the codec 32, and a moving image frame is generated as denoted by numeral 403 in FIG. 4. Then, the process proceeds to step S8, in which the moving image frame is written into the recording medium 200. Then in step S9, it is determined whether or not termination of movie capturing has been instructed. When it is determined that the termination of movie capturing has not instructed, the process returns to step S6 to continuously perform the movie recording processing.

FIG. 5 depicts a view illustrating a table describing the relation between the operation modes set in the image capturing control changeover processing in step S2 or S4 in FIG. 3 and control parameters.

First, as frame rate types according to the present embodiment, 22, 24, 25, 30, 50 and 60 fps are prepared. Note that 22 fps is used for flicker detection as a predetermined frame rate not in synchronization with flicker in the commercial power supply frequencies of 50 Hz and 60 Hz. The other 24, 25, 30, 50 and 60 fps are user-selectable moving image frame rates. In this manner, the control parameter is used for designation of the recording frame rate in still image capturing and/or movie capturing and image signal readout such as thinning reading with the image capturing device.

Further, as the readout with the image sensor 14 according to the present embodiment, "full-pixel readout", "thinning readout 1", "thinning readout 2", and "partial readout" are employed. The "full-pixel readout" is a mode to read image data detected with all the pixels of the image sensor 14 in vertical and horizontal directions used only upon still image capturing since the period of reading is long. The "thinning readout 1" is a mode for high speed reading with the ⅓ of all the pixels of the image sensor 14 used upon EVF display in normal still image capturing or recording at 24, 25 or 30 fps moving image frame rate. Further, the "thinning readout 2" is a mode for higher speed reading with increased thinning ratio in comparison with the "thinning readout 1" at 50 or 60 fps moving image frame rate. The "partial readout" is set when only a part of image data of angle of view is used upon for example enlarged display by reading only pixel data detected in a part of the area of the image sensor 14 without thinning.

As described above, in the image capturing control changeover processing in step S2 or S4 in FIG. 3, the readout with the image sensor and the frame rate shown in FIG. 5 are determined in accordance with set operation status, and the image capturing control is changed.

FIG. 6 depicts a view illustrating a table describing the relation between video output settings and selectable frame rates in the digital camera 100 according to the present embodiment. The relation between video output settings and selectable frame rates is stored as a table in for example the nonvolatile memory 56. When the video output mode is set, selectable frame rates are displayed on the LCD monitor 417 in correspondence with the set video output mode for the user's selection. This operation is performed at step S4 in the above-described FIG. 3.

When the video output setting is the NTSC system as one of television broadcast standards, the display frame rate is 60 fps. Accordingly, for synchronization with the display frame rate, 30 and 60 fps to satisfy 60 fps/n (integer) are selectable. On the other hand, when the video output setting is the PAL system as another television broadcast standard, the display frame rate is 50 fps. Accordingly, for synchronization with the display frame rate, 25 and 50 fps to satisfy 50 fps/n (integer) are selectable. Further, as the frame rate of 24 fps corresponding to a film mode (cinema mode) is not in complete synchronization with any of the video output settings, this frame rate is selectable in both NTSC and PAL systems.

FIG. 7 depicts a view illustrating a table describing the relation between the video output settings and the frame rates automatically selected as a default setting (initial setting) upon video output setting changeover in the digital camera 100 according to the present embodiment.

In a case where the frame rate of 30 fps is selected in the NTSC system, when the video output setting is changed to the PAL system, the frame rate of 25 fps is automatically selected as shown in FIG. 7. On the other hand, in a case where the frame rate of 25 fps is selected in the PAL system, when the video output setting is changed to the NTSC system, the frame rate of 30 fps is automatically selected. Further, in a case where the frame rate of 60 fps is selected in the NTSC system, when the video output setting is changed to the PAL system, the frame rate of 50 fps is automatically selected. On the other hand, in a case where the frame rate of 50 fps is selected in the PAL system, when the video output setting is changed to the NTSC system, the frame rate of 60 fps is automatically selected.

As described above, according to the present embodiment, control is performed such that image data readout from the image sensor and a recording frame rate can be selected in accordance with image capturing operation status such as still image capturing, movie capturing and recording at an arbitrary frame rate or enlarged display. With this arrangement, optimum EVF display and movie recording can be realized in each operation status. Further, image quality degradation due to flicker in displayed images and recorded images can be prevented by flicker detection control before EVF display in the movie capturing mode or during a first constant time period after the start of the movie capturing mode. Further, as a captured moving image is not EVF displayed during flicker detection, unnatural moving image display can be prevented. Further, unconformity between a selected moving image frame rate and a video display frame rate can be prevented by setting moving image frame rates which can be selected in accordance with video output setting.

As described above, the embodiment of the present invention has been described, however, the present invention is not limited to the above-described embodiment, but various modifications and changes can be made within the scope of the object matter. For example, in the present embodiment, as enlarged display cannot be performed with the assumed specifications upon movie recording, the frame rate of 30 fps is fixed upon the enlarged display. However, if the specifications are arranged such that movie recording can be performed while enlarged display is performed, otherwise if enlarged display can be performed during movie recording in the specifications, the frame rate can be changed to a set frame rate and movie recording can be performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-194642, filed Aug. 25, 2009, which is hereby incorporated by reference herein in its entirety.

What is claimed is:

1. An image capturing apparatus comprising:
   a photographing unit configured to capture image of an object to generate an image signal;
   a mode setting unit configured to set an image capturing mode from a plurality of image capturing modes corresponding to different video systems of different standards, wherein a control value to be set in each of the plurality of image capturing modes is different from each other; and
   a control unit configured to control so as to:
   (i) perform a flicker detection based on an image signal obtained by performing image capturing operation by the photographing unit based on a first control value, and then set a second control value corresponding to a first image capturing mode set by the mode setting unit and perform the image capturing operation by the photographing unit based on the second control value, in a case that the mode setting unit sets the first image capturing mode and the flicker detection is performed, and
   (ii) perform the flicker detection based on an image signal obtained by performing image capturing operation by the photographing unit based on the first control value, and then set a third control value corresponding to a second image capturing mode set by the mode setting unit and perform the image capturing operation by the photographing unit based on the third control value, in a case that the mode setting unit sets the second image capturing mode and the flicker detection is performed,
   wherein the first control value is different from the second control value and the third control value.

2. The image capturing apparatus according to claim 1, wherein the first control value, the second control value, and the third control value are related to a frame rate for the image signal.

3. The image capturing apparatus according to claim 1, wherein the first control value, the second control value, and the third control value are related to a method of reading out the image signal from the photographing unit.

4. The image capturing apparatus according to claim 2, further comprising a recording unit configured to record the image signal at a frame rate specified by a control parameter on a recording medium.

5. The image capturing apparatus according to claim 1, wherein the frame rate related to the first control value is a frame rate not in synchronization with a frequency of a commercial power supply.

6. A control method for controlling an image capturing apparatus comprising:
   capturing image of an object to generate an image signal;
   setting an image capturing mode from a plurality of image capturing modes corresponding to different video systems of different standards, wherein a control value to be set in each of the plurality of image capturing modes is different from each other; and
   controlling to (i) perform a flicker detection based on an image signal obtained by performing image capturing operation by the photographing unit based on a first control value, and then set a second control value corresponding to a first image capturing mode set in the setting step and perform the image capturing operation in the capturing step, in a case that the mode setting step sets the first image capturing mode and the flicker detection is performed, and (ii) perform the flicker detection based on an image signal obtained by performing image capturing operation by the photographing unit based on the first control value, and then set a third control value corresponding to a second image capturing mode set by the mode setting unit and perform the image capturing operation by the photographing unit based on the third control value, in a case that the mode setting unit sets the second image capturing mode and the flicker detection is performed, wherein the first control value is different from the second control value and the third control value.

7. The image capturing apparatus according to claim 1, wherein the video systems include the NTSC system.

8. The image capturing apparatus according to claim 1, wherein the video systems include the PAL system.

* * * * *